US012502286B2

(12) United States Patent
Zouaghi

(10) Patent No.: US 12,502,286 B2
(45) Date of Patent: Dec. 23, 2025

(54) TIBIAL TRIAL INSERT SYSTEM

(71) Applicant: Aesculap AG, Tuttlingen (DE)

(72) Inventor: Housseyn Zouaghi, Metz (FR)

(73) Assignee: Aesculap AG, Tuttlingen (DE)

( * ) Notice: Subject to any disclaimer, the term of this patent is extended or adjusted under 35 U.S.C. 154(b) by 237 days.

(21) Appl. No.: 18/557,352

(22) PCT Filed: Apr. 22, 2022

(86) PCT No.: PCT/EP2022/060717
§ 371 (c)(1),
(2) Date: Oct. 26, 2023

(87) PCT Pub. No.: WO2022/229027
PCT Pub. Date: Nov. 3, 2022

(65) Prior Publication Data
US 2024/0207069 A1    Jun. 27, 2024

(30) Foreign Application Priority Data

Apr. 27, 2021 (EP) .................................... 21170758

(51) Int. Cl.
*A61F 2/38* (2006.01)
*A61F 2/46* (2006.01)
*A61F 2/30* (2006.01)

(52) U.S. Cl.
CPC .......... *A61F 2/4684* (2013.01); *A61F 2/3868* (2013.01); *A61F 2002/30324* (2013.01);
(Continued)

(58) Field of Classification Search
CPC ........... A61B 17/025; A61B 2017/0268; A61F 2/4684; A61F 2/3868; A61F 2002/30324;
(Continued)

(56) References Cited

U.S. PATENT DOCUMENTS 9,144,495 B2 * 9/2015 Lin ........................ A61F 2/4684
10,271,965 B2 * 4/2019 Dungy .................. A61F 2/4657
(Continued)

OTHER PUBLICATIONS

Search Report received in International Application No. PCT/EP2022/060717 dated Aug. 1, 2022, 7 pages.
(Continued)

*Primary Examiner* — Jessica Weiss
(74) *Attorney, Agent, or Firm* — Christopher A. Rothe; CM Law

(57) ABSTRACT

A tibial trial insert system includes a bearing having a superior articulating surface and an inferior surface; a plate having a superior surface and an inferior fixation surface; a first adjustment assembly and a second adjustment assembly, each adjustment assembly arrangeable between the inferior surface of the bearing and the superior surface of the plate, and each adjustment assembly having a superior connector to engage the bearing and an inferior base to engage the plate. A plurality of shims are slidable between an inferior surface of the connector and a superior surface of the base of the first and/or second adjustment assembly to adjust a proximal/distal height of the respective adjustment assembly to adjust a proximal/distal spacing between the bearing and the plate. The first adjustment assembly allows adjustment of the spacing within a first range. The second adjustment assembly allows adjustment of the spacing within a second range.

14 Claims, 10 Drawing Sheets

(52) U.S. Cl.
CPC .............. *A61F 2002/30354* (2013.01); *A61F 2002/30553* (2013.01); *A61F 2002/30601* (2013.01)

(58) Field of Classification Search
CPC .. A61F 2002/30354; A61F 2002/30553; A61F 2002/30601
USPC .................................................. 606/90, 102
See application file for complete search history.

(56) References Cited

U.S. PATENT DOCUMENTS

| | | | |
|---|---|---|---|
| 2012/0158152 A1* | 6/2012 | Claypool | A61F 2/389 623/20.32 |
| 2013/0006376 A1 | 1/2013 | Wogoman et al. | |
| 2013/0079671 A1* | 3/2013 | Stein | A61B 5/1036 600/587 |
| 2013/0138112 A1* | 5/2013 | Young | A61B 17/025 606/90 |
| 2013/0261759 A1* | 10/2013 | Claypool | A61B 5/1036 623/20.33 |
| 2014/0052269 A1* | 2/2014 | Claypool | A61F 2/30734 623/20.33 |
| 2014/0277543 A1 | 9/2014 | Fox et al. | |
| 2015/0359642 A1 | 12/2015 | Claypool et al. | |
| 2016/0346098 A1 | 12/2016 | Uthgenannt et al. | |
| 2017/0105849 A1 | 4/2017 | Wogoman et al. | |
| 2019/0076273 A1* | 3/2019 | Goodchild | A61B 5/6878 |
| 2020/0046509 A1* | 2/2020 | Manuel | A61F 2/3859 |
| 2024/0238102 A1* | 7/2024 | Nonnenmann | A61F 2/461 |

OTHER PUBLICATIONS

Written Opinion received in International Application No. PCT/EP2022/060717 dated Aug. 1, 2022, 6 pages.

* cited by examiner

TIBIAL TRIAL INSERT SYSTEM

CROSS-REFERENCE TO RELATED APPLICATIONS

This application is the United States national stage entry of International Application No. PCT/EP2022/060717, filed on Apr. 22, 2022, and claims priority to European Application No. 21170758.3, filed on Apr. 27, 2021. The contents of International Application No. PCT/EP2022/060717 and European Application No. 21170758.3 are incorporated by reference herein in their entireties.

FIELD

The invention relates to a tibial trial insert system.

BACKGROUND

During a total knee arthroplasty, tibial trial insert systems are typically used to assist a surgeon in determining a size, shape or other configuration of a permanent prosthesis that is designed to replace a portion of the knee joint. In particular, such tibial trial insert systems are used to determine a relative spacing between a femoral component and a tibial component of the permanent prosthesis.

US 2015/0359642 A1 discloses a tibial trial insert system comprising a bearing component having a superior articulating surface and an inferior surface; a base component having a superior surface and an inferior surface, the base component configured to removably engage with the bearing component; and a plurality of shims, each shim configured to be slidable between the inferior surface of the bearing component and the superior surface of the base component to change a relative proximal/distal spacing between the bearing component and the base component.

SUMMARY

It is an object of the present invention to provide an alternative tibial trial insert system.

According to one aspect, a tibial trial insert system is provided, said tibial trial insert system comprising: a bearing component having a superior articulating surface and an inferior surface; a plate component having a superior surface and an inferior fixation surface; at least a first spacing adjustment assembly and a second spacing adjustment assembly, each spacing adjustment assembly configured to be arrangeable between the inferior surface of the bearing component and the superior surface of the plate component, and each spacing adjustment assembly having at least one superior connector element configured to removably engage with the bearing component and at least one inferior base element configured to removably engage with the plate component, wherein the connector element is movably coupled to the base element in proximal/distal direction; a plurality of shims, each shim configured to be slidable between an inferior surface of the connector element and a superior surface of the base element of the first spacing adjustment assembly and/or the second spacing adjustment assembly to adjust a proximal/distal height of the respective spacing adjustment assembly, in order to thereby adjust a relative proximal/distal spacing between the bearing component and the plate component; wherein the first spacing adjustment assembly is configured to allow an adjustment of the proximal/distal spacing within a first adjustment range and the second spacing adjustment assembly is configured to allow an adjustment of the proximal/distal spacing within a second adjustment range. Owing to the solution according to the invention, in particular an improved adjustment of the proximal/distal spacing can be achieved. In particular stacking of a large number of shims one above the other to obtain a suitable distal/proximal spacing can be prevented. Such superposed stacking of a large number of shims may cause, in particular, detrimental dimensional deviations and/or reduced stability of the tibial trial insert system. In order to counteract such effects, the tibial trial insert system according to the invention includes at least two different spacing adjustment assemblies, namely at least the first spacing adjustment assembly and the second spacing adjustment assembly. The at least two spacing adjustment assemblies are exchangeable against each other during use of the tibial trial insert system. Accordingly, there are actually not both spacing adjustment assemblies disposed at the same time between the bearing component and the plate component, but either the first or the second spacing adjustment assembly. The spacing adjustment assemblies have different adjustment ranges, namely the first adjustment range and the second adjustment range. The different adjustment ranges are achieved by a different configuration of the spacing adjustment assemblies. To this end, the first spacing adjustment assembly has one or more of a size and/or dimension that differs from the respective size and/or dimension of the second spacing adjustment assembly. Preferably, the base element of the first spacing adjustment assembly has a smaller thickness than the base element of the second spacing adjustment assembly, or vice versa. As an alternative or in addition, the connector element of the first spacing adjustment assembly can have a smaller thickness than the connector element of the second spacing adjustment assembly, or vice versa. Further as an alternative or in addition, the base element and the connector element of the second spacing adjustment assembly—without additional provision of a shim—may be farther spaced from each other in the proximal direction than the base element and the connector element of the first spacing adjustment assembly. In this document, the terms "superior", "inferior", "anterior", "posterior", "medial", "lateral", "proximal" and "distal" are used according to their standard anatomical definitions. In this document the phrase "proximal/distal spacing" denotes a spacing that extends in proximal and/or distal direction. Analogously, the phrase "anterior/posterior" means anterior and/or posterior; the phrase "medial/lateral" means medial and/or lateral. The plate component can also be termed "tibial plateau component".

In one embodiment each spacing adjustment assembly is adjustable between a minimum height and a maximum height, wherein the minimum height of the second spacing adjustment assembly is equal to or greater than the maximum height of the first spacing adjustment assembly. The adjustment between the minimum height and the maximum height is obtained in each case by inserting at least one shim of the plurality of shims between the inferior surface of the respective connector element and the superior surface of the respective base element. The respective minimum height is achieved without inserting of a shim. For achieving the respective maximum height, at least one of the shims is required. Preferably, the respective maximum height is limited by a stop acting in the proximal/distal direction between the respective connector element and the respective base element. The minimum of the first adjustment range is achieved when the first adjustment assembly is adjusted to its minimum height. The maximum of the first adjustment range is achieved when the first spacing adjustment assembly is adjusted to its maximum height. The minimum of the second adjustment range is achieved when the second spatial adjustment assembly is adjusted to its minimum height. The maximum of the second adjustment range is achieved when the second spacing adjustment assembly is adjusted to its maximum height.

In one embodiment the first spacing adjustment assembly and the second spacing adjustment assembly differ with respect to a thickness of the respective base element in order to allow the adjustment within the different first and second adjustment ranges. This embodiment of the invention allows a particularly simple design adaptation and/or dimensioning of the different adjustment ranges. In simple terms, the difference in thickness of the two base elements causes an offset between the first adjustment range and the second adjustment range, which dimensionally corresponds to the difference in thickness. Preferably, the first spacing adjustment assembly and the second spacing adjustment assembly are at least largely, preferably completely, of identical design, with the exception of the different thicknesses of the base elements. As a result, in particular cost benefits may be achieved due to simplified manufacture and assembly.

In one embodiment the thickness of the base element of the second spacing adjustment assembly is at least 8 mm larger than the thickness of the base element of the first spacing adjustment assembly. The inventors have found that a difference of at least 8 mm offers particular advantages. In this way, an offset of at least 8 mm between the first adjustment range and the second adjustment range is achieved. Preferably, the difference between the thickness of the base element of the second spacing adjustment assembly and of the base element of the first spacing adjustment assembly is exactly 8 mm.

In one embodiment the plurality of shims comprises a first set of shims provided together and a second set of shims provided together, the first set of shims configured for use with the first spacing adjustment assembly and the second set of shims configured for use with the second spacing adjustment assembly. Preferably, the shims of the first set of shims are each slidable between the inferior surface of the connector element and the superior surface of the base element of the first spacing adjustment assembly, while being not slidable between the respective surfaces of the second spacing adjustment assembly. Preferably, the same holds vice versa for the shims of the second set of shims. For this purpose, at least a size, dimension or shape of the shims of the first set of shims is matched to a corresponding size, dimension and/or shape of the first spacing adjustment assembly. The same applies correspondingly in regard to the configuration of the shims of the second set of shims. The shims of the first set of shims may have an identical design. As an alternative, the shims may have a different design as to dimensions, for examples in regard to their thicknesses. The same applies again correspondingly to the shims of the second set of shims. The shims may each be used individually or in addition with further shims of the respective set in order to form a superposed stack of shims.

In one embodiment the first set of shims comprises at least a first shim having a first thickness and a second shim having a second thickness, the second thickness being twice the first thickness. The inventors have found that, owing to this embodiment of the invention, a particularly advantageous adaptation in predetermined incremental steps within the first adjustment range can be achieved. Preferably, the first thickness is between 0.5 mm and 1.5 mm, particularly preferred 1 mm.

In one embodiment the second set of shims comprises at least a third shim having a third thickness, the third thickness being twice the second thickness. The inventors have found that in this way a particularly advantageous incremental adjustment within the second adjustment range can be achieved. Preferably, the third thickness is between 3 mm and 5 mm, particularly preferred 4 mm.

In one embodiment different shims of the plurality of shims have different matching portions, wherein the different matching portions differ in size and/or shape and are thereby configured either for matching with a complementary first matching portion of the first spacing adjustment assembly or for matching with a complementary second matching portion of the second spacing adjustment assembly. The differently sized and/or shaped matching portions ensure that a respective one of the shims is usable either for adjusting the proximal/distal height of the first spacing adjustment assembly or of the second spacing adjustment assembly. The different configurations of the complementary first matching portion and the complementary second matching portion ensure that merely one of the shims provided for that purpose in intended use is insertable between the inferior surface of the respective connector element and the superior surface of the respective base element. In an inserted state for intended use, appropriately fitting matching portions interact preferably in a form-fitted manner. In contrast, not complementary matching portions preferably act as a type of stop which prevents complete insertion for intended use of the respective shim. Preferably, the complementary matching portions of the spacing adjustment assemblies are disposed on the respective connector element and/or the respective base element.

In one embodiment the matching portions are formed as concave matching surfaces and the complementary matching portions are formed as convex matching surfaces, or vice versa. This embodiment offers particular advantages in regard to simple and cost-efficient manufacture of the matching portions. Preferably, a main extension direction of the surface normal of the respective matching surface extends in anterior/posterior direction.

In one embodiment—with respect to each of the spacing adjustment assemblies—engagement of the respective connector element with the bearing component and engagement of the respective base element with the plate component restrains an anterior/posterior movement and/or a medial/lateral movement between the bearing component and the plate component. For engagement with the respective base element, the plate component preferably has a recess, into which recess a portion provided for that purpose can be accommodated in anterior/posterior direction and/or medial/lateral direction in a form-fitting manner. For engagement with the respective connector element, the bearing component preferably has an engagement portion which interacts with a complementary engagement portion of the respective connector element, thereby forming a plug-in, latching and/or snap-in connection. The respective connector element is coupled to the respective base element to be movable in proximal, distal direction. Preferably, the movability between the respective connector element and the respective base element in the proximal direction is limited by means of a stop or the like. Further preferred, the respective base element and the respective connector element are coupled to be immobile in relation to each other in the anterior/posterior direction and/or medial/lateral direction.

In one embodiment each spacing adjustment assembly comprises at least one coupling arrangement configured to movably and captively couple the respective connector element with the respective base element. The respective connector element and the respective base element are coupled to each other to be movable relative to one another in proximal/distal direction by means of the coupling arrangement. In anterior/posterior direction and/or medial/lateral direction the coupling arrangement causes a preferably form-fitted connection between the respective connector element and the respective base element. If the respective spacing adjustment assembly includes more than one connector element, preferably, each of the connector elements is assigned a separate coupling arrangement.

In one embodiment each coupling arrangement forms a telescope mechanism which is extendable in proximal direction and retractable in distal direction. In this way, a particularly robust and easily to manufacture configuration of the coupling arrangement is achieved. The telescope mechanism is telescoping in the proximal/distal direction and, in this respect, extendable in the proximal direction and retractable in the distal direction. The respective telescope mechanism is fixed to the respective base element on one end and to the respective connector element on the other end.

In one embodiment each coupling arrangement comprises at least a first cylinder element and a second cylinder element, wherein the first cylinder element is slidably received in a bore of the base element, wherein the second cylinder element is slidably received in a bore of the first cylinder element, and wherein the second cylinder element is fixedly connected to the inferior surface of the respective connector element. Preferably, the bore of the base element and the bore of the first cylinder element are arranged coaxially. The bore of the base element and the bore of the first cylinder element extend in proximal/distal direction. This embodiment offers a furthermore simplified construction and at the same time a particularly robust and narrowly tolerated coupling between the respective connector element and the respective base element and, thus, also between the bearing component and the plate component.

BRIEF DESCRIPTION OF THE DRAWINGS

In the following, an embodiment of the invention will be described in detail with reference to the drawings. Throughout the drawings, the same elements will be denoted by the same reference numerals.

FIG. 7 is a detail top view of a first shim, a second shim and a third shim of a plurality of shims of the tibial trial insert system according to FIG. 1;

DETAILED DESCRIPTION

Figure 1:
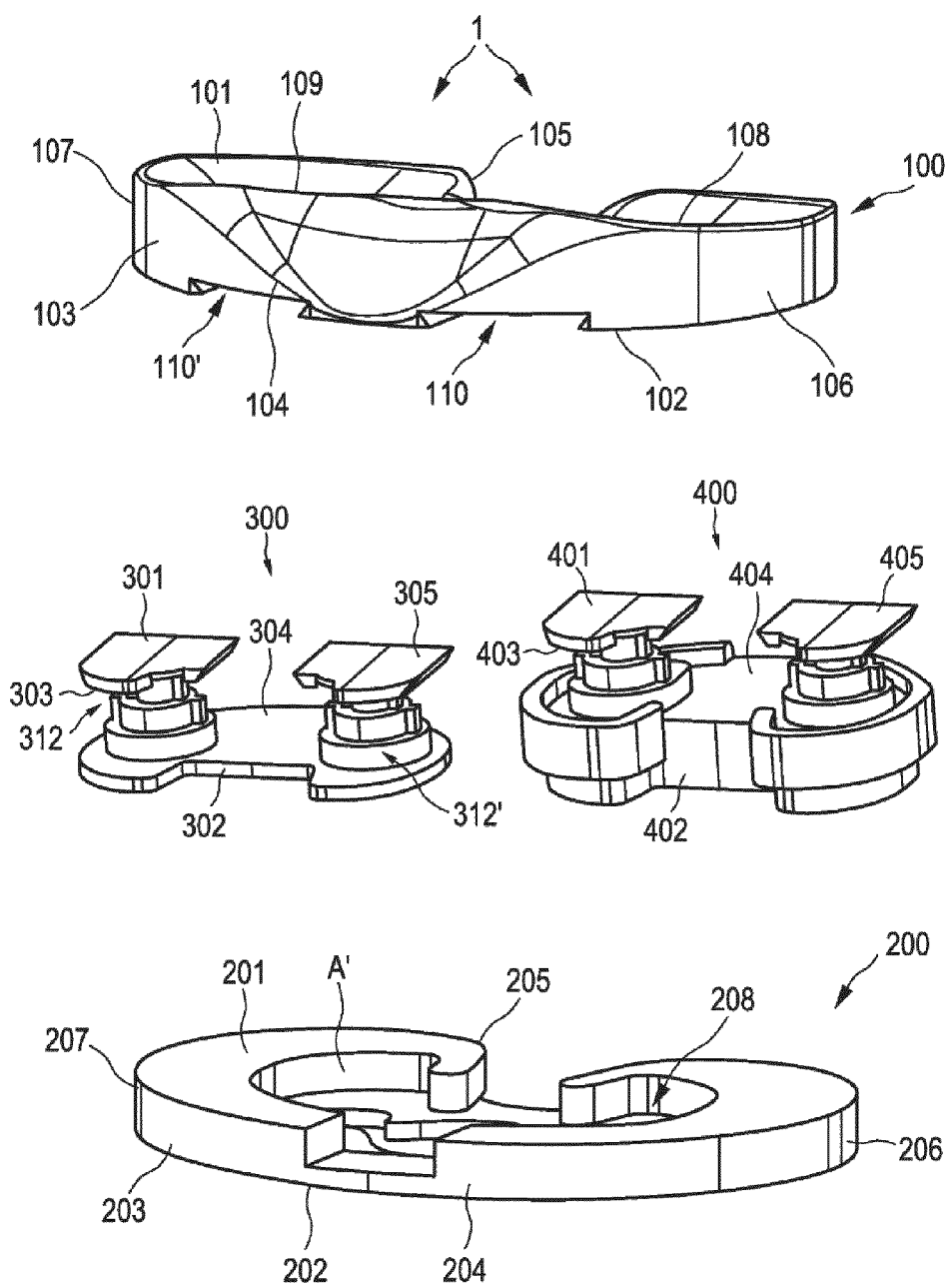
FIG. 1 is a perspective view an embodiment of a tibial trial insert system with a bearing component, a first and a second spacing adjustment assembly and a plate component, and in absence of a plurality of shims (cf.

According to FIG. 1, a tibial trial insert system 1 is provided for use in a knee joint replacement surgery. The tibial trial insert system 1 comprises a bearing component 100, a plate component 200, at least a first spacing adjustment assembly 300 and a second spacing adjustment assembly 400 and a plurality of shims 500, 600, 700 (FIG. 7) not shown in FIG. 1.

The bearing component 100 has a superior articulating surface 101, an opposing inferior surface 102 and a peripheral wall 103 extending from the inferior surface 102 to the superior articulating surface 101. The bearing component 100 further includes an anterior side 104, a posterior side 105, a lateral side 106 and a medial side 107. The superior articulating surface 101 is configured to articulate with natural or prosthetic condyles of a distal femur and includes a lateral articulating surface portion 108 and a medial articulating surface portion 109.

The plate component 200 has a superior surface 201, an opposing inferior fixation surface 202 and a peripheral wall 203 extending from the inferior fixation surface 202 to the superior surface 201. The plate component 200 further includes an anterior side 204, a posterior side 205, a lateral side 206 and a medial side 207. The inferior fixation surface is configured for direct or indirect fastening to a proximal end of a tibia.

The first spacing adjustment assembly 300 is configured to be arrangeable between the inferior surface 102 of the bearing component 100 and the superior surface 201 of the plate component 200. The first spacing adjustment assembly 300 comprises at least one superior connector element 301 configured to removably engage with the bearing component 100 and at least one inferior base element 302 configured to removably engage with the plate component 200, wherein the connector element 301 is coupled to the base element 302 to be movable in proximal/distal direction.

The second spacing adjustment assembly 400 is configured to be arrangeable between the inferior surface 102 of the bearing component 100 and the superior surface 201 of the plate component 200. The second spacing adjustment assembly 400 comprises at least one superior connector element 400 configured to removably engage with the bearing component 100 and at least one inferior base element 402 configured to removably engage with the plate component 200, wherein the connector element 401 is coupled to the base element 402 to be movable in proximal/distal direction.

The first spacing adjustment assembly 300 and the second spacing adjustment assembly 400 are intended for adjusting a relative proximal/distal spacing between the bearing component 100 and the plate component 200. In other words, both spacing adjustment assemblies 300, 400 are intended to position the superior articulating surface 101 and/or the bearing component 100 in different height levels relative to the plate component 200, in particular relative to the inferior fixation surface 202 of the plate component 200. Such a spacing or height adjustment is required for trial reposition in knee joint replacement surgery. Said trial reposition is a preceding operation step of the actual knee joint replacement, wherein sizes, dimensions and/or shapes of the tibial and femoral implant components required for a functional replacement of the knee joint are determined. This application related background of the tibial trial insert system 1 is well-known to a person skilled in the art. Therefore, no further explanations are needed in that respect.

With respect to said height and/or spacing adjustment, each shim 500, 600, 700 (FIG. 7) of said plurality of shims is configured to be slidable between an inferior surface 303, 403 of the at least one connector element 301, 401 and a superior surface 304, 404 of the at least one base element 302, 402 of the first spacing adjustment assembly 300 and/or the second spacing adjustment assembly 400 to adjust the proximal/distal height of the respective spacing adjustment assembly 300, 400, in order to thereby adjust the relative proximal/distal spacing between the bearing component 100 and the plate component 200.

For that purpose, a single shim or a plurality of superposed stacked shims can be inserted between the inferior surface 303, 403 and the superior surface 304, 404, also one after the other, as required.

The first spacing adjustment assembly 300 is configured to allow an adjustment of the proximal/distal spacing within a first adjustment range and the second spacing adjustment assembly 400 is configured to allow an adjustment of the proximal/distal spacing within a second adjustment range. For adjusting the proximal/distal spacing within the first adjustment range, the operating surgeon selects the first spacing adjustment assembly 300, places the latter between the bearing component 100 and the plate component 200, and connects the at least one connector element 301 and the base element 302 to the bearing component 100 and the plate component 200, respectively, in a manner described in more detail below. For adjusting the proximal, distal spacing within the first adjustment range, the operating surgeon can insert at least one of the shims 500, 600, 700 between the inferior surface 303 and the superior surface 304. For adapting the proximal/distal spacing within the second adjustment range, the operating surgeon selects the second spacing adjustment assembly 400, places the latter between the bearing component 100 and the plate component, and connects the at least one connector element 401 and the base element 402 to the bearing component 100 and the plate component 200, respectively, in a manner described in more detail below. For adapting the proximal/distal spacing within the second adjustment range, the operating surgeon can insert at least one of the shims 500, 600, 700 between the inferior surface 403 and the superior surface 404.

Figure 3:
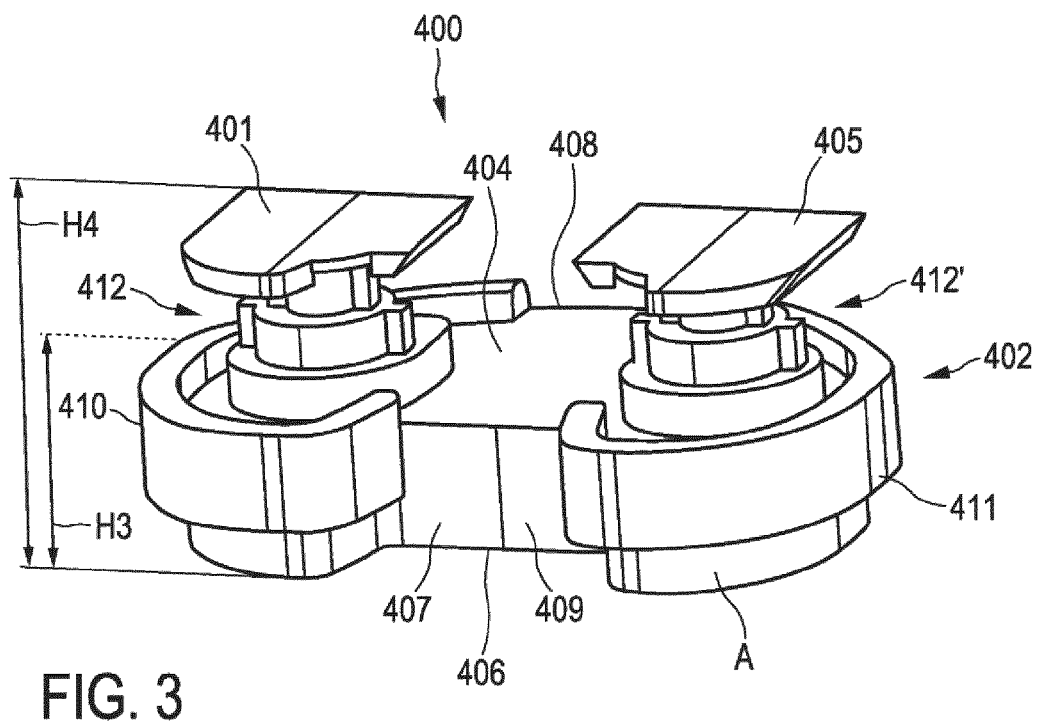
FIG. 3 is a perspective detail view of the second spacing adjustment assembly of the tibial trial insert system according to FIG. 1.

In the embodiment as illustrated, the first spacing adjustment assembly 300 includes two superior connector elements 301, 305. Said elements may also be referred to as lateral connector element 301 and medial connector element 305. The same applies correspondingly to the configuration of the second spacing adjustment assembly 400 (FIG. 3). Such a configuration having a medial connector element 305, 405 and a lateral connector element 301, 401 is advantageous, but not mandatory. Accordingly, in an embodiment not illustrated in the drawings, merely one superior connector element is provided.

The physical configuration and operative functionality of the first spacing adjustment assembly 300 and the second spacing adjustment assembly 400 are most largely—but not completely—identical. To avoid repetitions, predominantly the configuration and operative functionality of the first spacing adjustment assembly 300 will be discussed below. The same applies correspondingly in regard to the second spacing adjustment assembly 400, unless otherwise described.

The base element 302 has an inferior surface 306 disposed opposite the superior surface 304. Moreover, the base element 302 has a peripheral wall 307 extending between the inferior surface 306 and the superior surface 304, and an anterior side 308, a posterior side 309, a lateral side 310 and a medial side 311. The peripheral wall 307 has an outer contour A. For removable engagement with the base element 302, the plate component 200 has a receiving recess 208 which is countersunk in the distal direction into the superior surface 201. The receiving recess 208 has an inner contour A' which is complementary to the outer contour A. In a condition received in the receiving recess 208, the base element 302 is restrained in the anterior/posterior direction and lateral/medial direction.

For movable coupling of the lateral connector element 301 to the base element 302, the first spacing adjustment assembly 300 includes a coupling arrangement 312. The coupling arrangement 312 is configured to movably and captively couple the medial connector element 301 with the base element 302. The coupling arrangement 312 forms a telescope mechanism which is extendable in proximal direction and retractable in distal direction.

Figure 4:
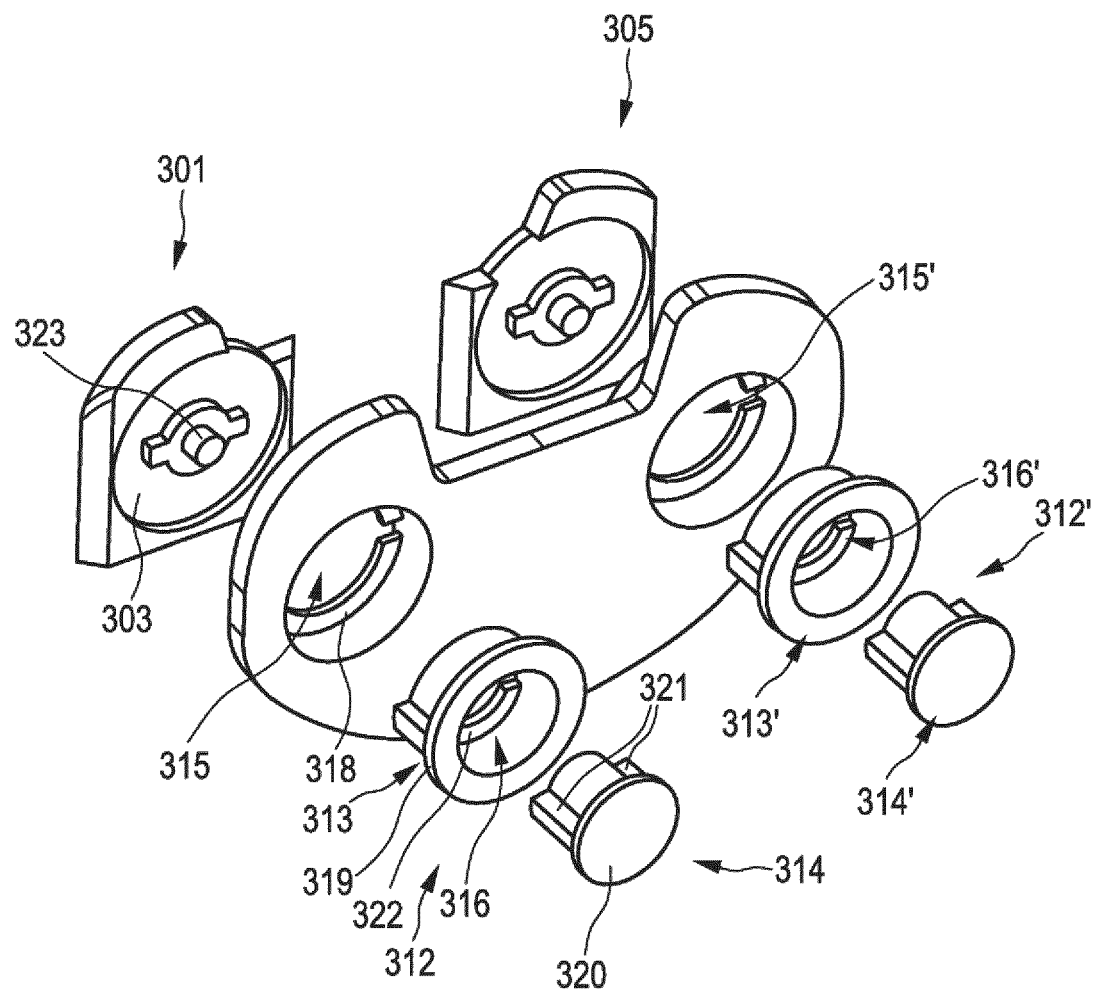
FIG. 4 is a perspective exploded view of the first spacing adjustment assembly according to FIG. 2.

In the embodiment as illustrated, the coupling arrangement 312 comprises at least a first cylinder element 313 and a second cylinder element 314. The first cylinder element 313 is slidably received in a bore 315 of the base element 302, the second cylinder element 314 is slidably received in a bore 316 of the first cylinder element 313, and the second cylinder element 314 is fixedly connected to the inferior surface 303 of the medial connector element 301 (FIG. 4).

The bores 315, 316 extend coaxially in the proximal/distal direction and are configured as through bores. The bore 315 is provided with radial guiding slots 317 which are produced in a proximal end wall 318. The first cylinder element 313 comprises guiding ridges (not specified in more detail) projecting in the radial direction which interact in the peripheral direction with the guiding slots 317 in a form-fitting manner. In this way, any unintentional turning of the first cylinder element 313 in the bore 315 is inhibited. The proximal end wall 318 acts as a stop and limits displaceability of the first cylinder element 313 in the proximal direction relative to the base element 302. In that context, the proximal end wall 318 interacts with a distal radial collar 319 of the first cylinder element 313.

In accordance with the first cylinder element 313, the second cylinder element 314 comprises a distal radial collar 320 and two guiding ridges 321 projecting diametrically in the radial direction. The radial collar 320 interacts with a proximal end wall 322 of the first cylinder element 313 for limiting the proximal displaceability of the second cylinder element 314 relative to the first cylinder element 313.

The proximal end of the second cylinder element 314 is fixedly joined to the inferior surface 302 of the medial connector element 301. In the embodiment as shown, a welded connection is provided for that purpose between a pin element 323 towering from the inferior surface 302 in the distal direction, and a pin hole inserted into the proximal end of the second cylinder element 314 in the distal direction, which pin hole is not visible in more detail. As a result, the medial connector element 301 is capable of guided displacement relative to the base element 302 in a limited manner in proximal/distal direction.

The coupling arrangement 312 may also be referred to as medial coupling arrangement. For coupling of the medial connector element 305 with limited movability, accordingly a medial coupling arrangement 312' is provided (FIG. 4). The configuration and operative functionality of the medial coupling arrangement 312' are identical to the configuration and operative functionality of the lateral coupling arrangement 312. The disclosure given in relation to the lateral coupling arrangement 312 applies correspondingly also in regard to the medial coupling arrangement 312'.

For removable engagement with the lateral connector element 301, the bearing component 101 comprises an engagement portion 110. The engagement portion 110 is countersunk into the inferior surface 102 of the bearing component 100 in the proximal direction. In the embodiment as illustrated, the engagement portion 110 is designed in the form of a dove tail guide. The latter is plug-in connectable to the lateral connector element 301 in anterior/posterior direction. In the plugged-together state, relative movement between the lateral connector element 301 and the bearing component 100 is inhibited, in any case in proximal/distal direction and in medial/lateral direction. Moreover, the bearing component 100 comprises a further engagement portion 110' which is provided for removable engagement with the medial connector element 305 and is designed in correspondence to the engagement portion 110.

The second spacing adjustment assembly 400, illustrated in particular with reference to FIG. 3, is most largely identical to the first spacing adjustment assembly 300, as discussed before, wherein in particular a lateral coupling arrangement 412 and a medial coupling arrangement 412' are provided. To avoid repetitions, components and/or portions of the second spacing adjustment assembly 400 which are identical to those of the first spacing adjustment assembly 300 will not be explained specifically. In particular with reference to FIG. 3, said components and/or portions are marked with reference numerals which are in accordance with corresponding reference numerals of the first spacing adjustment assembly 300 as to their respective second and third digits.

The essential difference between the first and second spacing adjustment assemblies 300, 400 is in a configuration of the respective base element 302 and 402, differing in thickness. The base element 302 of the first spacing adjustment assembly 300 has a thickness T1. The base element 302 of the second spacing adjustment assembly 400 has a thickness T2.

In the embodiment as illustrated, the thickness T1 is defined as the distance between the inferior surface 306 and the superior surface 304 in proximal/distal direction. The same applies correspondingly in regard to the definition of the thickness T2 of the base element 402. Of course, definitions of thickness deviating therefrom are also conceivable. For example, the thickness can be defined as a proximal/distal spacing between the respective inferior surface and a proximal upper edge of the bores 315, 315' and 415, 415', respectively.

The thickness T1 may also be referred to as first thickness. The thickness T2 may also be referred to as second thickness. In the embodiment as illustrated, the difference between the first thickness T1 and the second thickness T2 is essential for said difference between the first adjustment range and the second adjustment range.

Figure 2:
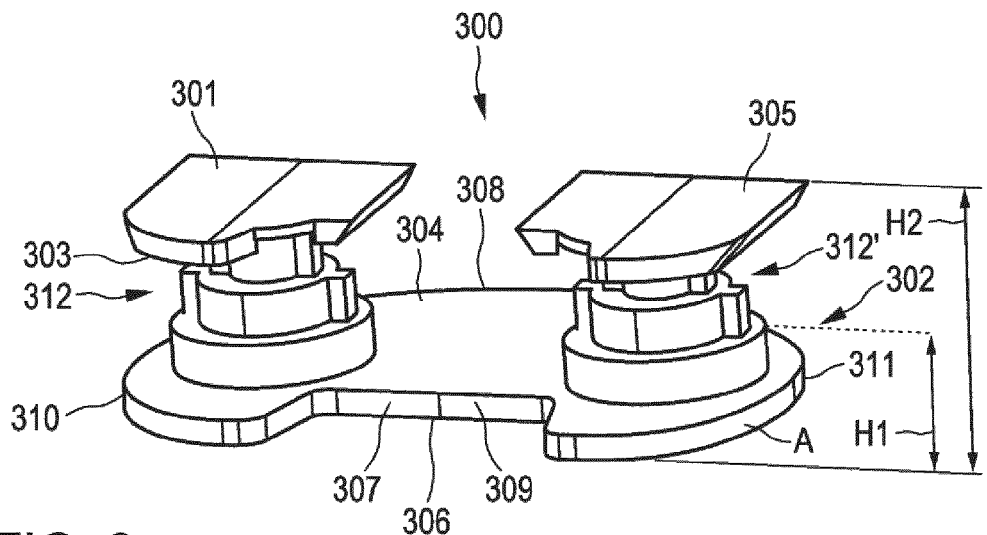
FIG. 2 is a perspective detail view of the first spacing adjustment assembly of the tibial trial insert system according to FIG. 1.

In the configurations illustrated with reference to FIGS. 2 and 3, the connector elements 301, 305, 401, 405 are displaced in the proximal direction relative to the respective base element 302, 402. In that context, the first spacing adjustment assembly 300 assumes a maximum height H2. The merely schematically illustrated minimum height H1 is reached when both the connector elements 301, 305 are each displaced to a maximum in the distal direction. In such a condition, the inferior surfaces of the connector elements 301, 305 each rest flat on the base element 302. The second spacing adjustment assembly 400 is correspondingly adjustable between a minimum height H3 and a maximum height H4. In the embodiment as illustrated, the maximum height H2 of the first spacing adjustment assembly 300 is equal to the minimum height H3 of the second spacing adjustment assembly 400.

Figure 7:
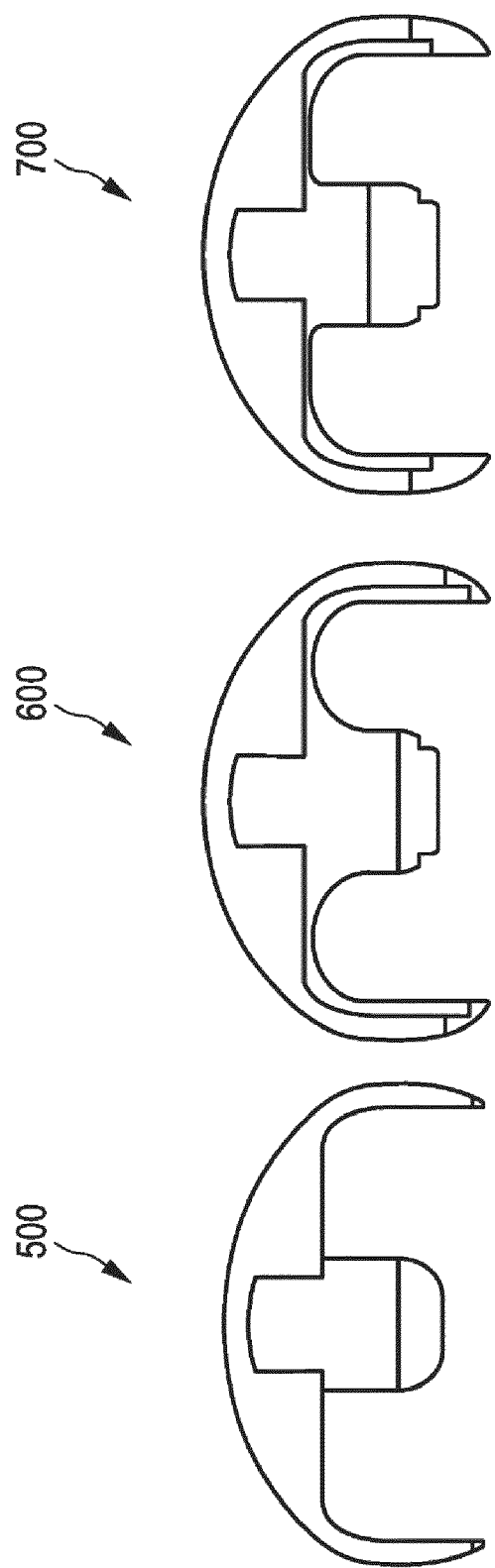
FIG. 7)
Figure 8:
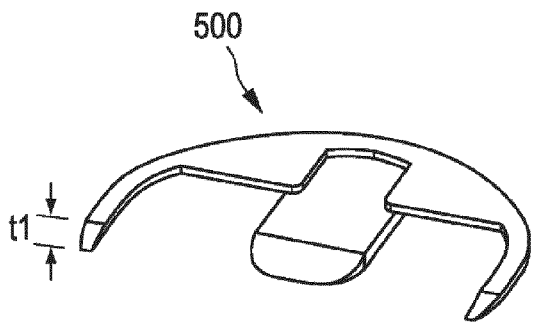
FIG. 8 is a perspective detail view of the first shim with a line of sight directed towards a superior surface of the first shim.
Figure 9:
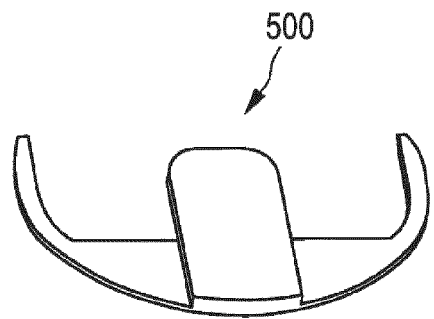
FIG. 9 is a further perspective detail view of the first shim with a line of sight directed towards an inferior surface of the first shim.
Figure 10:
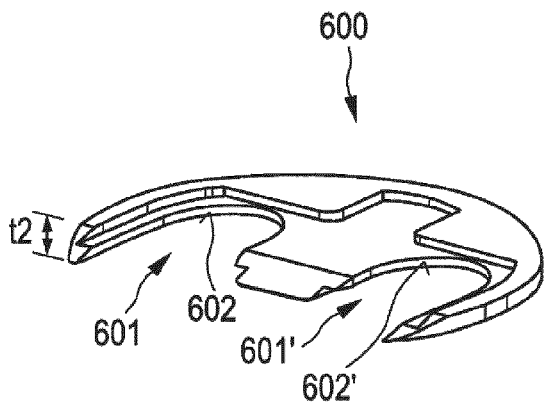
FIGS. 10 and 11 are different perspective detail views of the second shim similar to the views according to FIGS. 8 and 9, respectively.
Figure 11:
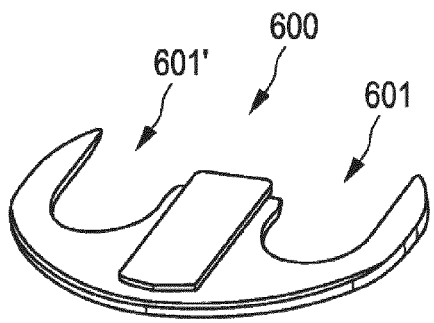
Figure 12:
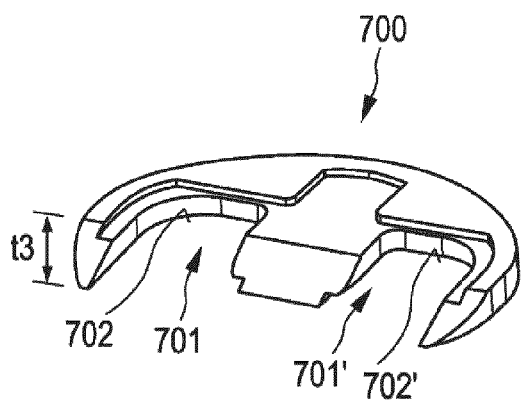
FIGS. 12 and 13 are different perspective detail views of the third shim similar to the views according to FIGS. 8 and 9, respectively.
Figure 13:
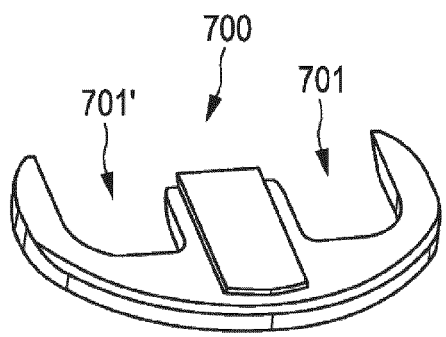
Figure 14:
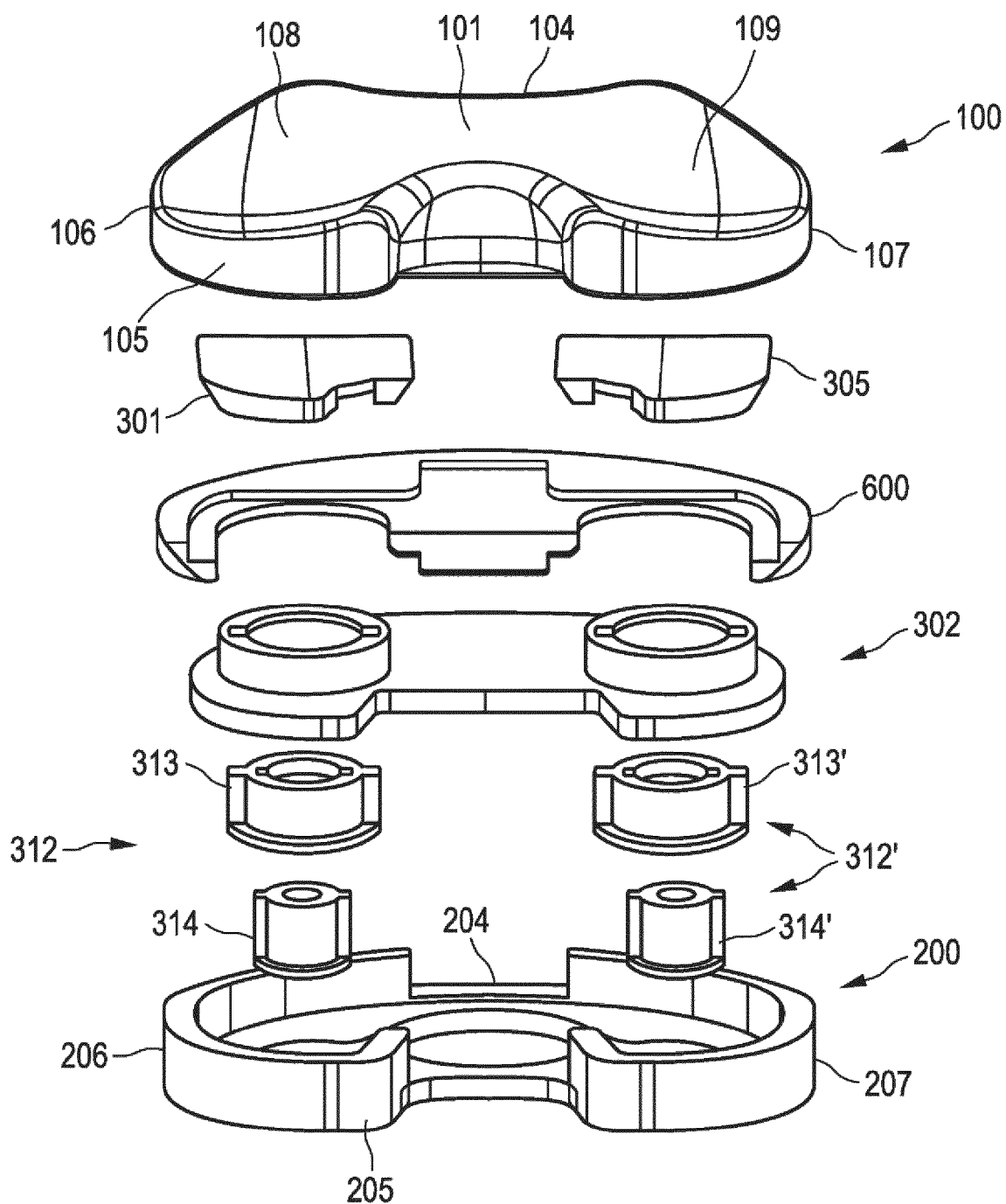
FIG. 14 is a perspective exploded view of a configuration of the tibial trial insert system according to FIG. 1, wherein the first spacing adjustment assembly is arranged between the bearing component and the plate component.
Figure 15:
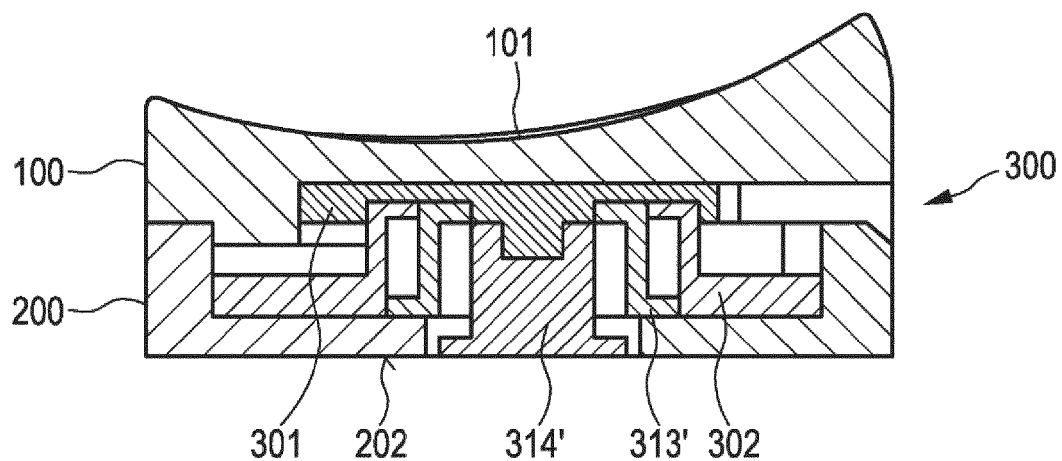
FIGS. 15 and 16 are sectional views along a sagittal plane (FIG. 15) and along a frontal plane (FIG. 16) of a configuration of the tibial trial insert system according to FIG. 1, wherein the first spacing adjustment assembly is arranged between the bearing component and the plate component, and having a minimal proximal/distal spacing between the bearing component and the plate component.
Figure 16:
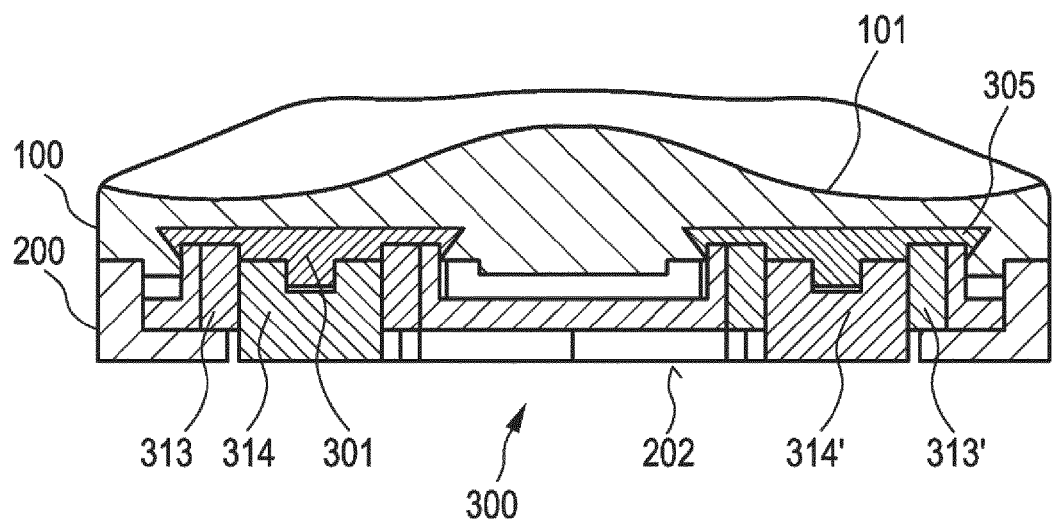
Figure 17:
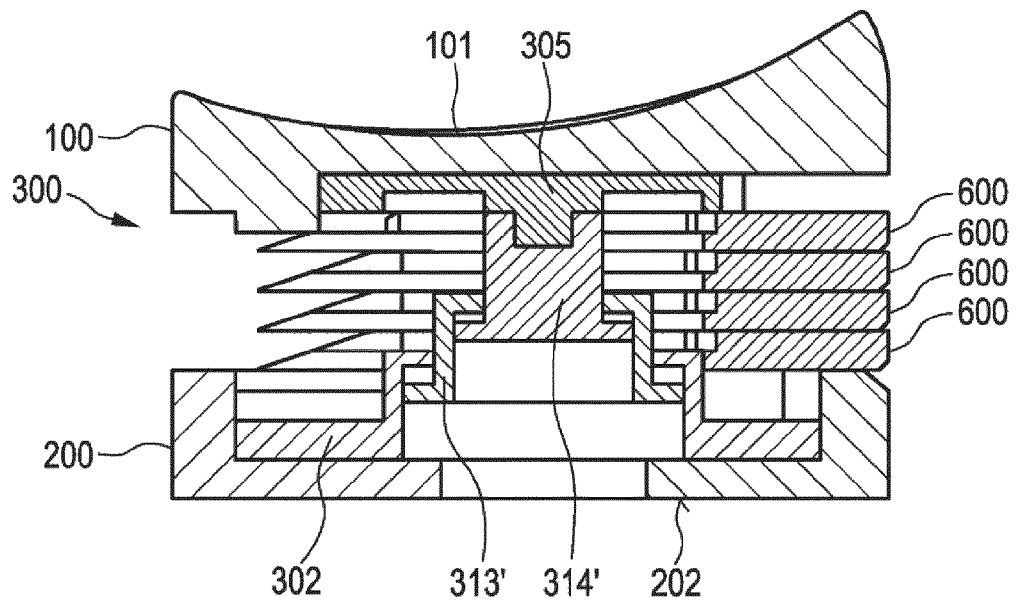
FIGS. 17 and 18 are sectional views along a sagittal plane (FIG. 17) and along a frontal plane (FIG. 18) of a configuration of the tibial trial insert system according to FIG. 1, wherein the first spacing adjustment assembly is arranged between the bearing component and the plate component, and wherein the proximal/distal spacing between the bearing component and the plate component is adjusted to its maximum by means of several shims.
Figure 18:
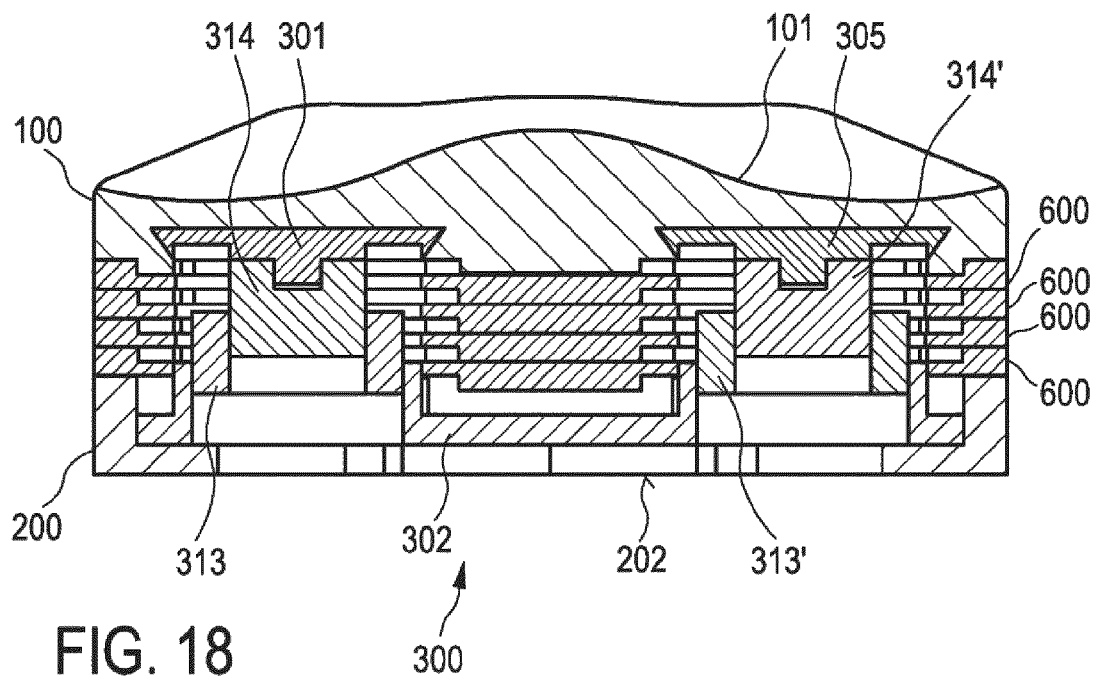

For adjusting the height of the two spacing adjustment assemblies 300, 400, the tibial trial insert system 1 comprises a plurality of shims, three shims 500, 600, 700 of the plurality of shims being illustrated as an example with reference to FIG. 7. The dots in FIG. 7 symbolize that the plurality of shims can comprise further shims in addition to the shims 500, 600, 700 expressively depicted in FIG. 7. The shims depicted therein can also be referred to as first shim 500, second shim 600, and third shim 700. The plurality of shims comprises at least one first shim 500, one second shim 600 and one third shim 700. Preferably, the plurality of shims comprises several first shims, several second shims and several third shims.

In the embodiment as illustrated, the first shim 500 and the second shim 600 are provided exclusively for adjusting the height of the first spacing adjustment assembly 300. The third shim 700 is provided exclusively for adjusting the height of the second spacing adjustment assembly 400.

Figure 5:
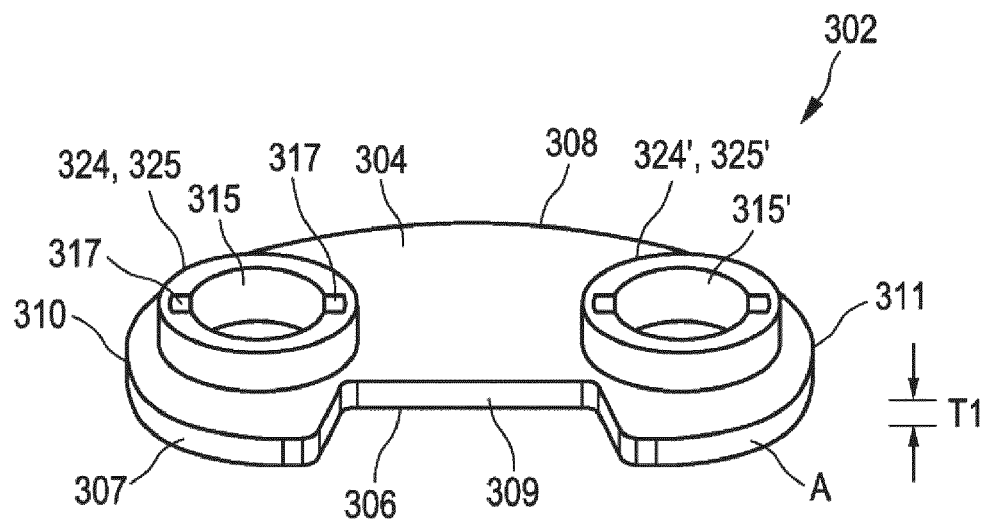
FIG. 5 is a perspective detail view of a base element of the first spacing adjustment assembly according to FIG. 2.
Figure 6:
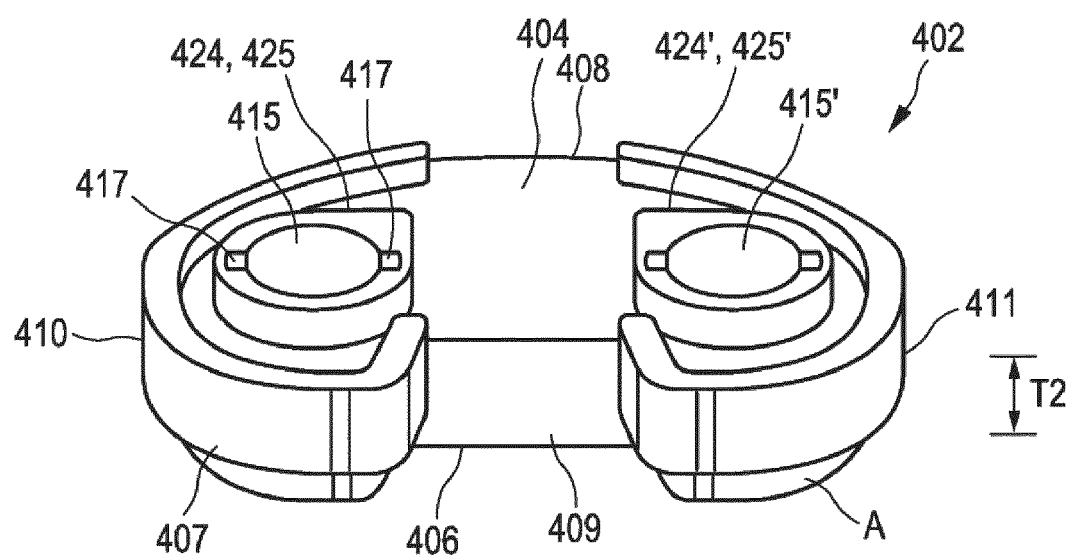
FIG. 6 is a perspective detail view of a base element of the second spacing adjustment assembly according to FIG. 3.

In order to prevent any not intended assignment of the second shim 600 to the second spacing adjustment assembly 400, the second shim 600 includes at least one matching portion 601 which is configured for matched fitting with a complementary first matching portion 324 of the base element 302 (FIG. 5). In a completely inserted state of the second shim 600, the matching portion 601 rests on the complementary first matching portion 324, contacting across the surface.

The third shim 700 includes at least one matching portion 701 of different shape, which can be fitted matching with a complementary second matching portion 424 of the base element 402 of the second spacing adjustment assembly 400. Thereby, the different configuration and/or shape of the matching portions 601, 701 of the two shims 600, 700 prevent any not intended use of the shims.

The matching portions 601, 701 are each in the form of a concave matching surface 602 and 702, respectively. The complementary first matching portion 324 is accordingly in the form of a convex matching surface 325. The same applies correspondingly to the design of the complementary second matching portion 424 in the form of a convex matching surface 425.

In the embodiment as illustrated, the complementary first matching portion 324 is a radially oriented outer circumference which towers from the superior surface 304 in the proximal direction and surrounds the bore 315 concentrically. The same applies correspondingly in regard to the complementary second matching portion 424. In that context, as compared to the complementary first matching portion 324, the complementary second matching portion 424 has radial bulge (not specified in more detail) which is shaped complementary to a depression of the matching portion 701 or the concave matching surface 702 of the third shim 700 (not specified in more detail).

In the embodiment as illustrated, the second shim 600 comprises a further matching portion 601' which is configured as a further concave matching surface 602'. In this respect, it may also be referred to as medial and lateral matching portions 601, 601'. Accordingly, also the base element 302 comprises a further first matching portion 324' which is configured as a further convex matching surface 325'. The same applies correspondingly in regards to the configuration of the third shim 700 and the base element 402.

As illustrated in particular with reference to FIGS. 8 to 13, the shims 500, 600, 700 have different thicknesses t1, t2, t3 in the proximal/distal direction. The first shim 500 has a first thickness t1. The second shim 600 has a second thickness t2. The third shim 700 has a third thickness t3.

In the embodiment as illustrated, the second thickness t2 is twice the first thickness t1. The third thickness t3 is twice the second thickness t2. In the present case, 1 mm is provided as the first thickness t1. The second thickness t2 and the third thickness t3 are accordingly 2 mm and 4 mm, respectively.

In the embodiment as illustrated, the difference between the thickness t2 of the base element 402 and the thickness t1 of the base element 302 is 8 mm.

With reference to FIGS. 15 to 21, different configurations of the tibial trial insert system 1 are shown in different sectional views and in different height level adjustment situations.

The FIGS. 15 to 18 show the tibial trial insert system 1 in a first configuration for adjusting the proximal/distal spacing within the first adjustment range. For that purpose, the first spacing adjustment assembly 300 is disposed between the bearing component 100 and the plate component 200, in the above described manner. In a first adjustment situation (FIGS. 15, 16), the first spacing adjustment assembly 300 assumes its minimum height H1. Thereby, the articulating surface 101 is spaced 10 mm from the inferior fixation surface 202. In the present case, there is no shim needed to produce this adjustment situation.

In an exemplary second adjustment situation (FIGS. 17, 18), the articulating surface 101 is located 18 mm above the inferior fixation surface 202. Said adjustment is produced by inserting a total of four superposed stacked second shims 600. In this case, the first spacing adjustment assembly 300 assumes its maximum height H2.

It is evident that further adjustment situations are possible with said first configuration of the tibial trial insert system 1. In the present case, the proximal/distal spacing is adjustable to 10 mm (FIGS. 15, 16), 11 mm, 12 mm, 14 mm, 16 mm and 18 mm (FIGS. 17, 18) are provided. For adjustment to 11 mm, a first shim 500 is inserted, in the present case. For adjustment to 12 mm, a second shim 600 is inserted instead. For adjustment to 14 mm, 16 mm or 18 mm, there are two, three or four second shims inserted as a superposed stack.

For adjusting the first spacing adjustment assembly 300 within the first adjustment range to the above described discrete proximal/distal spacings, the tibial trial insert system 1 comprises a first set of shims (not expressively illustrated in the drawings in more detail). The first set of shims is provided together and consists of four second shims 600 and one first shim 500.

Figure 19:
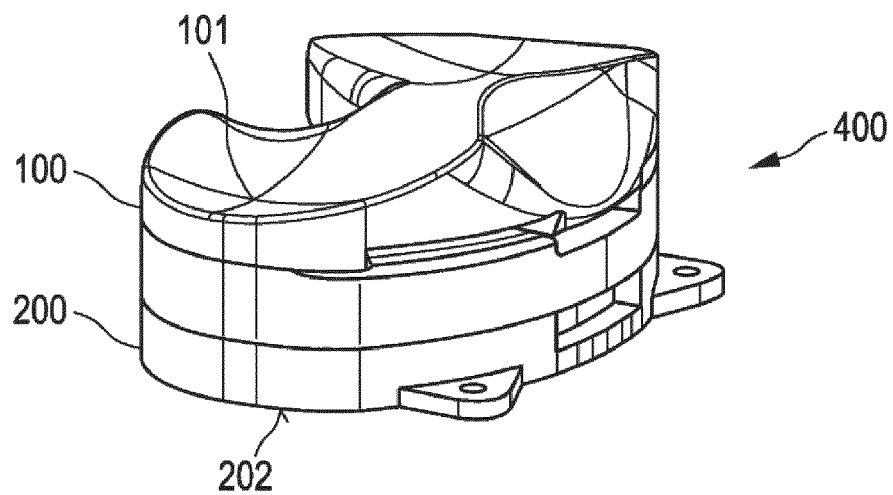
FIG. 19 is a perspective view of a configuration of the tibial trial insert system according to FIG. 1, wherein the second spacing adjustment assembly is arranged between the bearing component and the plate component, and having a minimal proximal/distal spacing between the bearing component and the plate component.
Figure 20:
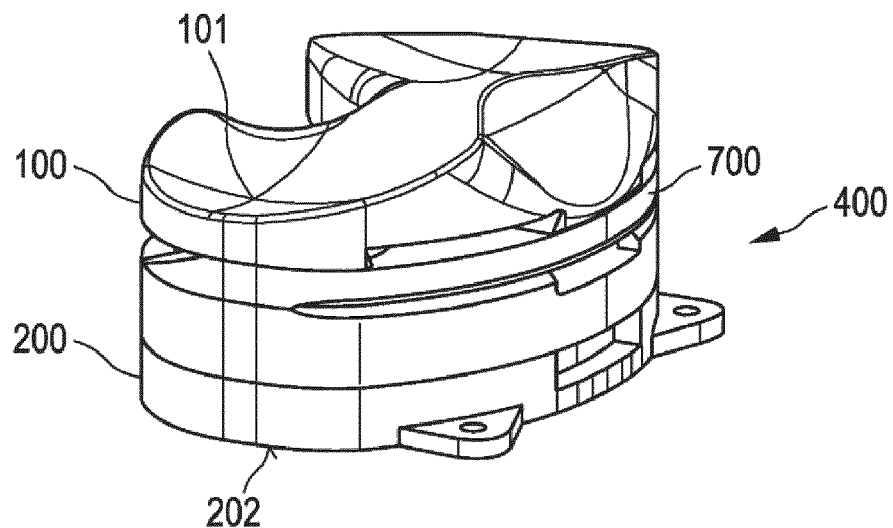
FIG. 20 is a further perspective view of a configuration similar to FIG. 19, wherein the proximal/distal spacing between the bearing component and the plate component is adjusted by means of inserting a third shim.
Figure 21:
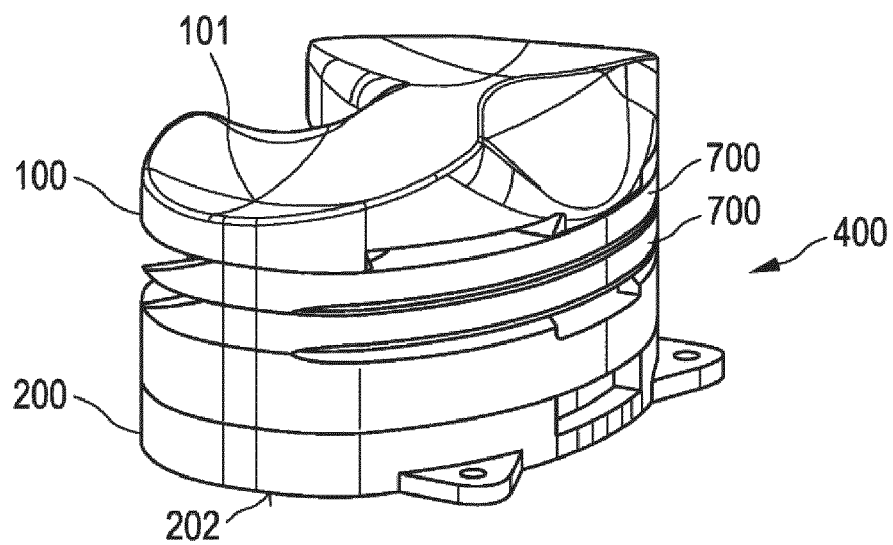
FIG. 21 is a further perspective view of a configuration similar to FIGS. 19 and 20, wherein the proximal/distal spacing is adjusted to its maximum by means of inserting an additional third shim.

With reference to FIGS. 19 to 21, a second configuration of the tibial trial insert system 1 is shown which allows adjusting of the proximal/distal spacing within the second adjustment range. For that purpose, instead of the first spacing adjustment assembly 300, the second spacing adjustment assembly 400 is disposed between the bearing component 100 and the plate component 200. In the embodiment as illustrated, said second configuration allows for three adjustment situations. In the first adjustment situation (FIG. 19), the second spacing adjustment assembly 400 assumes its minimum height H3. Said height corresponds to the maximum height H2 of the first spacing adjustment assembly 300. Accordingly, the superior articulating surface 101 is 18 mm spaced from the inferior fixation surface 202. For producing said first adjustment situation of the second configuration, there is no shim needed.

In a second adjustment situation (FIG. 20), a third shim 700 is inserted. As a result, a comparatively greater proximal/distal height of the second spacing adjustment assembly 400 and, thus, also a greater proximal/distal spacing is obtained. The height and the spacing, respectively, are increased by the thickness t3 of the third shim 700 such that a proximal/distal spacing of 22 mm is obtained.

In a third adjustment situation (FIG. 1), the second spacing adjustment assembly 400 assumes its maximum height H4. For that purpose, two third shims are inserted such that a proximal/distal spacing of 26 mm is obtained in the present case.

For adjusting the height of the second spacing adjustment assembly 400, the tibial trial insert system 1 comprises a second set of shims (not expressively illustrated in the drawings in more detail). The second set of shims is provided together. In the embodiment as illustrated, the second set of shims consists of two third shims.

The invention claimed is:

1. A tibial trial insert system comprising:
   a bearing component having a superior articulating surface and an inferior surface;
   a plate component having a superior surface and an inferior fixation surface;
   at least a first spacing adjustment assembly and a second spacing adjustment assembly, each of the first spacing adjustment assembly and the second spacing adjustment assembly configured to be arrangeable between the inferior surface of the bearing component and the superior surface of the plate component, each of the first spacing adjustment assembly and the second spacing adjustment assembly having at least one superior connector element configured to removably engage with the bearing component and at least one inferior base element configured to removably engage with the plate component, wherein each at least one superior connector element is movably coupled to the respective at least one inferior base element in a proximal/distal direction; and a plurality of shims, each shim configured to be slidable between an inferior surface of the at least one superior connector element and a superior surface of the at least one inferior base element of the first spacing adjustment assembly and/or the second spacing adjustment assembly to adjust a proximal/distal height of said first spacing adjustment assembly and/or said second spacing adjustment assembly, in order to thereby adjust a proximal/distal spacing between the bearing component and the plate component, wherein the first spacing adjustment assembly is configured to allow an adjustment of the proximal/distal spacing within a first adjustment range and the second spacing adjustment assembly is configured to allow an adjustment of the proximal/distal spacing within a second adjustment range.

2. The tibial trial insert system according to claim 1, wherein each of the first and second spacing adjustment assemblies is adjustable between a minimum height and a maximum height, wherein the minimum height of the second spacing adjustment assembly is equal to or greater than the maximum height of the first spacing adjustment assembly.

3. The tibial trial insert system according to claim 1, wherein the at least one inferior base element of the first spacing adjustment assembly has a first thickness, and the at least one inferior base element of the second spacing adjustment assembly has a second thickness that differs from the first thickness in order to allow adjustment within the first adjustment range and the second adjustment range.

4. The tibial trial insert system according to claim 3, wherein the second thickness is at least 8 mm larger than the first thickness.

5. The tibial trial insert system according to claim 1, wherein the plurality of shims comprises a first set of shims provided together and a second set of shims provided together, the first set of shims configured for use with the first spacing adjustment assembly and the second set of shims configured for use with the second spacing adjustment assembly.

6. The tibial trial insert system according to claim 5, wherein the first set of shims comprises at least a first shim having a first thickness and a second shim having a second thickness, the second thickness being twice the first thickness.

7. The tibial trial insert system according to claim 6, wherein the second set of shims comprises at least a third shim having a third thickness, the third thickness being twice the second thickness.

8. The tibial trial insert system according to claim 1, wherein each shim has a thickness between 1 mm and 4 mm.

9. The tibial trial insert system according to claim 1, wherein different shims of the plurality of shims have different matching portions, wherein the matching portions differ in size and/or shape and are configured either for matching with a complementary first matching portion of the first spacing adjustment assembly or for matching with a complementary second matching portion of the second spacing adjustment assembly.

10. The tibial trial insert system according to claim 9, wherein the matching portions are formed as concave matching surfaces, and the complementary first matching portion and the complementary second matching portion are formed as convex matching surfaces, or vice versa.

11. The tibial trial insert system according to claim 1, wherein, with respect to each of the first and second spacing adjustment assemblies, engagement of the at least one superior connector element with the bearing component and engagement of the at least one inferior base element with the plate component restrains an anterior/posterior movement and/or a medial/lateral movement between the bearing component and the plate component.

12. The tibial trial insert system according to claim 1, wherein each of the first and second spacing adjustment assemblies comprises at least one coupling arrangement configured to movably and captively couple the respective at least one superior connector element with the respective least one inferior base element.

13. The tibial trial insert system according to claim 12, wherein each coupling arrangement forms a telescope mechanism that is extendable in a proximal direction and retractable in a distal direction.

14. The tibial trial insert system according to claim 12, wherein each coupling arrangement comprises at least a first cylinder element and a second cylinder element, wherein the first cylinder element is slidably received in a bore of the at least one inferior base element, wherein the second cylinder element is slidably received in a bore of the first cylinder element, and wherein the second cylinder element is fixedly connected to the inferior surface of the at least one superior connector element.

\* \* \* \* \*